Aug. 11, 1942.  J. B. BOURGEOIS  2,292,925
SAFETY APPLIANCE FOR HYDRAULIC BRAKE SYSTEMS
Filed June 24, 1940
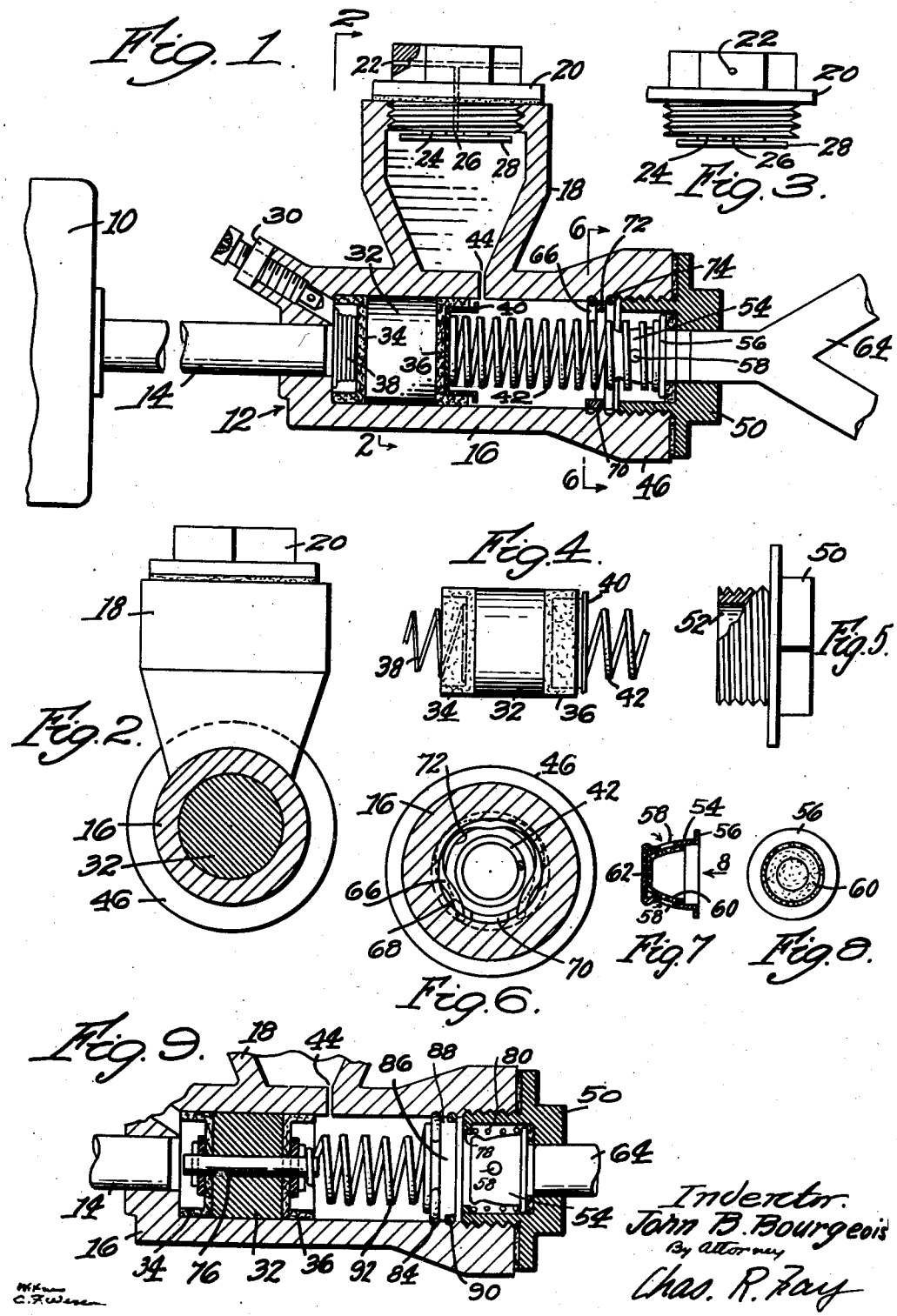
Inventor.
John B. Bourgeois
By attorney
Chas. R. Fay Patented Aug. 11, 1942

2,292,925

UNITED STATES PATENT OFFICE 2,292,925

SAFETY APPLIANCE FOR HYDRAULIC BRAKE SYSTEMS

John B. Bourgeois, Worcester, Mass.

Application June 24, 1940, Serial No. 342,122

8 Claims. (Cl. 303—84)

This invention relates to an appliance for hydraulic brake systems and more particularly to a device which I term a sub-master cylinder for application to the conventional hydraulic brakes for vehicles.

Objects of the invention include the provision of a safety means in a hydraulic brake system to prevent the escape of the liquid from the master cylinder in case of breakage of a line to a wheel; the provision of a sub-master cylinder for the purpose described which will not interfere with the normal operation of the brakes, but which will prevent loss of liquid from the master cylinder as to one pair of brakes when a line in the other pair leaks or breaks; and the provision of a sub-master cylinder for the purpose described which is simple in construction, positive in operation, and relatively inexpensive to manufacture.

Other objects and advantages of the invention will appear hereinafter.

Reference is to be had to the accompanying drawing, in which

Fig. 1 is a sectional view thru a sub-master cylinder which embodies one form of my invention, and shows its attachment to the master cylinder;

Fig. 2 is a section on line 2—2 of Fig. 1;

Fig. 3 is an elevation of the reservoir cap;

Fig. 4 is a detail of the piston;

Fig. 5 is an elevation of the valve cap;

Fig. 6 is a section on line 6—6 of Fig. 1;

Fig. 7 is a section of a valve;

Fig. 8 is an elevation of the valve looking in the direction of arrow 8 in Fig. 7; and Fig. 9 is a section of a sub-master cylinder embodying a modified form of the invention.

It is well known that when a hydraulic brake line breaks or even leaks, the liquid escapes from the entire system and especially from the master cylinder, so that the brakes become ineffective and hence dangerous. The present invention provides a positive means to overcome this disability and to reduce the hazard of brake failure.

Referring to Fig. 1, there is generally shown a master cylinder 10 for a vehicle hydraulic brake system. My novel appliance, indicated generally at 12, may be attached to the cylinder 10 by a short hose 14, or may be directly attached, thus dispensing with the hose. The appliance comprises a casting embodying mainly a cylinder 16 and oil reservoir 18, the latter having a cap 20 which is formed with an air vent 22, which is led, as shown, down to a narrow neck 24 and terminates in an opening 26 behind a wide splash guard 28 to prevent escape of the oil. This cap is screw-threaded into the top of the reservoir 18, and can be removed so as to enable replenishment of the oil. A valve 30 is provided to enable replenishment of oil to the hose 14 and master cylinder 10, while preventing the formation of air pockets.

A piston 32 is located in cylinder 16, and oppositely extending rubber cups 34, 36 are provided at each end of the piston to act as washers, thus preventing seepage of oil in either direction past the piston. A light spring 38 abuts cup 34 to position the same tightly against the piston at all times. A small metal cup 40 fits inside rubber cup 36 and acts as an abutment for relatively heavy spring 42, to prevent the rubber from being cut by the spring. This spring 42 and cup 40 together position rubber cup 36 and prevent its displacement relative to the piston at all times. Also, of course, spring 42 exerts pressure on the piston to normally retain it at the left end of the cylinder, as seen in Fig. 4. There is a vent 44 between the reservoir 18 and the portion of cylinder 16 to the right of the piston, this vent assuring a full load of oil in this side of the cylinder.

At the end of cylinder 16 opposite to the master cylinder connection, there is an enlarged portion 46 which has an internal screw-threaded bore alined with and communicating with the cylinder walls. A nut 50 is adapted to be threaded into the bore, and this nut is hollow as at 52 to receive a valve 54. This valve is shown in detail in Figs. 7 and 8, and comprises a cup having an end flange 56 which receives the force of spring 42 and is thus resiliently pressed against a washer on the inside of the bore in nut 50 as shown in Fig. 1. Apertures 58 are provided in the sides of the valve and a rubber cup 60 is secured to the bottom of the valve at 62, but having its walls free to normally cover the apertures. Pressure from the left of the valve in Fig. 7 will cause the oil to enter the apertures 58 and displace the walls of the rubber cup 60 in the direction indicated by the arrows in this figure. Release of the pressure will allow the walls of the rubber cup to return to normal position closing apertures 58, to thus act as a check valve. Nut 50 is attached to a line 64, preferably leading to both front wheel brakes or both rear wheel brakes.

A lock is provided in the cylinder 16 to prevent escape of the piston 32, and thus prevent escape of liquid from master cylinder 10, in the event that nut 50 should be lost. This lock comprises a generally circular spring band 66 which is resiliently held in a circumferential groove in the cylinder wall, and this spring has a bent out portion 68 for the reception of a laterally extending locking lug 70 on a washer 72, to position the spring and to prevent collapse of the latter due to radial pressure. A backing up spring 74 is arranged to hold the washer in place.

The modification of Fig. 9 is generally similar to Fig. 1, but the piston 32 has a thru bolt 76 which is used to secure the cups 34, 36 thereto, thus avoiding use of spring 38 and cup 40. The valve 54 is located permanently in the nut 50 by means of an end flange 78, against which abuts a spring 80, the latter holding valve 54 against the nut 50 in the manner of spring 42. A lock, comprising a spring band 84, bar 86 with extending lugs 88, and spring 90, assembled as shown in Fig. 9, performs the function of lock 68, 72, but in this case, the spring 92, which bears thereagainst, its also retained even in the absence of nut 50 and its valve.

The operation of the device is as follows: with the parts as shown in Fig. 1, the hoses 14, 64 and the cylinder being filled with brake liquid, the brake pedal is actuated to stop the vehicle, and the pressure from the master cylinder is transmitted to piston 32, which thereupon moves against tension of spring 42, exerting pressure on the liquid in the cylinder. Vent 44 is closed by a very small travel of the piston, as will be clear. The now built-up pressure in the cylinder forces the rubber cup 60 to yield, and the liquid flows thru apertures 58 to exert pressure on the liquid in hose 64, thus actuating the brake cylinders, not shown. Upon release of the brake pedal, the brake cylinder springs will force the fluid in hose 64 backwards, and spring 42 will thus yield sufficiently to let valve 54 raise off the nut 50 to let the liquid escape from the hose into the cylinder. It will be seen that valve 54 is thus a sort of double check valve. It is to be noted that the master cylinder spring, not shown, must be balanced with spring 42, so as not to render it too hard to actuate the brake pedal. When the pressure in the master cylinder is released, spring 42 will push piston 32 back to normal position.

In case of failure of the line 64, so that the fluid escapes therefrom, the piston 32 and rubber cups 34, 36 prevent escape of the fluid from the master cylinder. The flange of cup 40 will act as a stop against spring 66 and prevent the piston from traveling far enough to the right in Fig. 1 to uncover vent 44, and also the cup 40 will prevent any possible tendency of the rubber cup 36 to turn inside out, under pressure from the master cylinder, against the spring 66.

The form of the invention shown in Fig. 9, works similarly to that of Fig. 1, but in this case, spring 92 acts only to resist the piston, while spring 80 is now, of course, the check valve spring.

It will be seen from the above that if this appliance be interposed in a line to the front brakes for instance, and hose 64 breaks or leaks, that the liquid cannot escape from the master cylinder, but only from the line 64 to the front wheels, hence the rear wheels will still be operative. Naturally it is intended to apply the invention to both front and rear wheels, and it is contemplated that one of my sub-master cylinders could be applied to the line for each wheel, so that only one brake at a time could become inoperative.

Having thus described my invention and the advantages thereof, I do not wish to be limited to the details herein disclosed, otherwise than as set forth in the claims, but what I claim is:

1. In a safety appliance for a hydraulic brake system, a cylinder, means at one end thereof for connection to a fluid pressure device, means at the other end of said cylinder for connection to a conduit, a piston in said cylinder, means urging said piston towards said first mentioned means, a valve in said cylinder on the side of the piston towards said second mentioned means, said second mentioned means comprising a nut having a bore and a shoulder, said valve seating on said shoulder and said bore accommodating said conduit.

2. In a safety appliance for a hydraulic brake system, a cylinder, conduit connecting means at each end of said cylinder, a piston in said cylinder having means at each end thereof to prevent the escape of a fluid past piston, a relatively heavy spring urging said piston towards one end of said cylinder, valve means at the other end thereof, means in said valve to allow the escape of fluid therepast and out of said cylinder upon movement of said piston against said urging means, and a relatively light spring between said one cylinder end and said piston.

3. In a safety appliance for a hydraulic brake system, a cylinder, conduit connecting means at each end of said cylinder, a piston in said cylinder having means to prevent the escape of a fluid past said piston, means resiliently urging said piston towards one end of said cylinder, a relatively fixed abutment for said piston urging means, valve means at the other end thereof, means in said valve to allow the escape of fluid therepast and out of said cylinder upon movement of said piston against said urging means, and separate means resiliently urging said valve in a direction opposite to said piston.

4. In a safety appliance for a hydraulic brake system, a cylinder, hose connections at each end thereof, a piston in said cylinder, means associated with said piston to prevent the escape of fluid therepast, a spring in said cylinder, a check valve, said spring urging said piston and valve towards opposite hose connections, a reservoir having an inlet between the piston and valve, said valve being constructed and arranged to allow passage of fluid under pressure in either direction, a separable abutment against which said spring urges said valve, and a lock in said cylinder to prevent escape of said piston upon removal of said abutment.

5. In a safety appliance for a hydraulic brake system, a cylinder, connections at each end thereof, a piston in said cylinder, a fixed lock in said cylinder, a spring reacting against said lock and said piston to urge the latter towards one connection, a cup-shaped element having a lip flange bearing against the end of the cylinder at the other connection, a separate spring engaging said flange and an abutment, there being apertures in said element and resilient means normally closing said apertures.

6. In a safety appliance for a hydraulic brake system, a cylinder, connections at each end thereof, a hollow nut threaded into one connection, a cup-shaped element having a flange to bear against said nut, a piston having rubber washers at each end thereof in said cylinder, a relatively heavy spring bearing against said flange and one of said washers to urge said piston away from said element, a light spring at the other side of said piston and bearing on the other of said washers, apertures in said element, means to normally close said apertures, and a circular spring in said cylinder having a part extending into the path of said piston to retain the same in the cylinder upon removal of said nut.

7. A closure cap for a liquid holding reservoir comprising a substantially solid body having a flange adapted to seat on the reservoir opening, a vent extending thru said body to both sides of the flange, a splash guard in the form of a flange at one side of said first named flange, said vent having an orifice between said flanges.

8. A closure cap as recited in claim 7 in which the flanges are generally parallel and the guard flange is adapted to extend into the reservoir.

JOHN B. BOURGEOIS.